United States Patent
Kennemur et al.

(10) Patent No.: US 10,640,587 B2
(45) Date of Patent: May 5, 2020

(54) POLYSTYRENE SULFONATE ANALOGS AND METHODS

(71) Applicant: FLORIDA STATE UNIVERSITY RESEARCH FOUNDATION, INC., Tallahassee, FL (US)

(72) Inventors: Justin G. Kennemur, Tallahassee, FL (US); William J. Neary, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 15 days.

(21) Appl. No.: 15/922,056

(22) Filed: Mar. 15, 2018

(65) Prior Publication Data

US 2018/0265607 A1   Sep. 20, 2018

Related U.S. Application Data

(60) Provisional application No. 62/471,535, filed on Mar. 15, 2017.

(51) Int. Cl.
C08F 12/30 (2006.01)
C08G 61/08 (2006.01)

(52) U.S. Cl.
CPC .............. *C08F 12/30* (2013.01); *C08G 61/08* (2013.01); *C08G 2261/148* (2013.01); *C08G 2261/3321* (2013.01); *C08G 2261/418* (2013.01); *C08G 2261/724* (2013.01)

(58) Field of Classification Search
CPC ........ C08G 2261/724; C08G 2261/418; C08F 12/30
See application file for complete search history.

(56) References Cited

U.S. PATENT DOCUMENTS

2003/0149189 A1 * 8/2003 Cheung ................. C08F 212/00
525/332.9

FOREIGN PATENT DOCUMENTS

WO        WO-0146276 A1 * 6/2001 ............ C08F 210/02

OTHER PUBLICATIONS

Kobayashi et al., "Regio- and Stereoselective Ring-Opening Metathesis Polymerization of 3-Substituted Cyclooctenes," American Chemical Society, 2011, 133:5794-5797.
Kobayashi et al, "Supporting Information for: Regio- and Stereoselective ROMP of 3-Substituted Cyclooctgenes," 2011, pp. S1-S104.
Schulz et al., "Precision Polymers through ADMET Polymerization," Macromol. Chem. Phys., 2014, 215:1936-1945.
Watson et al., "Functionalized Polyethylene via Acyclic Diene Metathesis Polymerization: Effect of Precise Placement of Functional Groups," Macromolecules, 2000, 33:8963-8970.

* cited by examiner

*Primary Examiner* — Mark S Kaucher
(74) *Attorney, Agent, or Firm* — Eversheds Sutherland (US) LLP

(57) ABSTRACT

Provided are polystyrene sulfonate analogs and methods of making polystyrene sulfonate analogs. The polystyrene sulfonate analogs may be formed by a ring opening metathesis polymerization (ROMP). The ROMP may provide analogs having a precise periodicity. The polystyrene sulfonate analogs may have a relatively low glass transition temperature.

19 Claims, 4 Drawing Sheets

POLYSTYRENE SULFONATE ANALOGS AND METHODS

CROSS-REFERENCE TO RELATED APPLICATIONS

This application claims priority to U.S. Provisional Patent Application No. 62/471,535, filed Mar. 15, 2017, which is incorporated herein by reference.

BACKGROUND

Polystyrene-sulfonate (PSS) is an ionically charged polymer classified as a polyelectrolyte or ionomer depending on the concentration of the sulfonate ions present. It has been used in a number of applications. For example, PSS has been used in osmosis membranes for water purification, cation exchange resins for treatment of hyperkalemia, and electrolyte layers in battery applications and electronic devices. PSS also has been used as an additive to aid in bitumen strength or oil remediation. Its ubiquitous use is largely due to the fact that PSS represents one of the few commercially available options for polyelectrolytes due, at least in part, to the fact that its parent precursor, polystyrene (PS), is produced in large quantities. PSS, however, often is considered too brittle due to its glassy state and $T_g$.

Copolymers can present opportunities to design materials with different and/or potentially advantageous properties when compared to homopolymers of their individual constituents. Although polyethylene and polystyrene are ubiquitous plastics, the synthesis of ethylene-styrene (ES) copolymers has been challenging due, at least in part, to the markedly different monomer reactivities, and, as a result, has been deemed non-viable in view of the limitations of traditional Ziegler-Natta catalyst systems. Ethylene and styrene monomers can be copolymerized to form ethylene-styrene copolymers, however, the catalysts used are complex, styrene incorporation is not precise, and/or it can be difficult to achieve high styrene content due at least in part to the differences in reactivity between ethylene and styrene.

The advent of well-defined "single-site" or molecular catalysts over the last few decades has brought new attention to the efficacy and utility of ES copolymers. A broad scope of material properties are realized when traversing from low to high styrene (S) content which can translate to a variety of applications for compatibilizers, packaging, films, foams, automobiles, construction materials, and/or bitumen modifiers. However, producing ES copolymers with high S content (>70% w/w) remains a formidable challenge, due to the fact that high S feed ratios typically are required and/or the processes can create difficult issues regarding homopolymer formation, product irreproducibility, and/or the discrete/complex nature of the molecular catalysts. Generally, it is known that the copolymerization of two different monomers can create a copolymer having a statistical distribution of the two repeat units, rather than a precise distribution.

An alternative strategy to ethylene copolymers is ring-opening metathesis polymerization (ROMP) of strained monocyclic alkenes or acyclic diene metathesis (ADMET) polymerization of linear dienes followed by hydrogenation of the backbone olefins. In both cases a singular monomer can be used to impart periodic chain branching with functionalities that are analogous to copolymer systems. Precision polymers are a subset of these materials that incorporate branches at exactly spaced periodicity along a polyethylene chain. The region-specific branching of these systems can lead to well-defined properties for specialty applications.

Precision ES copolymers, however, have been scarcely reported. A product has been reported having a phenyl substituent on every 19$^{th}$ backbone carbon through ADMET polymerization (Watson, M. D. et al., *Macromolecules* 2000, 33, 8963). This material, equivalent to 30% w/w S, was semi-crystalline and thermal analysis revealed complex melting transitions between −22.5 and −1.5° C. Another product has been reported that resulted from a highly regioregular (99.9% head-tail insertion) polymerization of cis-3-phenylcyclooctene; resulting in a precision ES copolymer with phenyl branches at every 8$^{th}$ carbon (55% w/w S) following hydrogenation (Kobayashi, S. et al., *J. Am. Chem. Soc.* 2011, 133, 5794). This material was amorphous and had a glass transition temperature ($T_g$) of −15° C.

There remains a need for sulfonated copolymers that are amorphous, have a relatively low glass transition temperature, have reduced phenyl branch periodicity, and/or overcome one or more of the foregoing disadvantages regarding copolymers, such as PSS and highly-sulfonated PSS.

BRIEF SUMMARY

Provided herein are polymers, and methods of making polymers that address one or more of the foregoing needs and/or disadvantages. For example, in embodiments, the polymers include sulfonated styrene-ethylene copolymer analogues that have a glass transition temperature of about 5° C. to about 40° C., which is believed to offer more flexibility and/or tractability at ambient temperature than PS and/or PSS. Moreover, in some embodiments, 100% sulfonation of one or more polymers herein results in approximately 30% less ionization than 100% PSS.

In embodiments, the polymers include a repeat unit having the following structure:

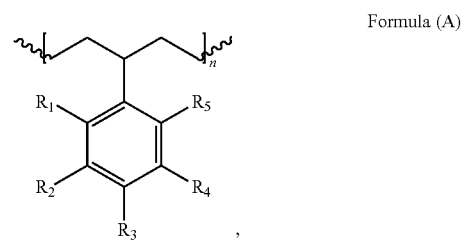

Formula (A)

wherein $R_1$-$R_5$ are independently selected from hydrogen, sulfonate, sulfonic acid, or a monovalent $C_1$-$C_{10}$ hydrocarbyl, at least one of $R_1$-$R_5$ is sulfonate or sulfonic acid, and n is 1 to 10,000. In one embodiment, $R_1$, $R_2$, $R_4$, and $R_5$ are hydrogen, and $R_3$ is sulfonate or sulfonic acid.

Also provided herein are polymers having repeat units according to Formula (B):

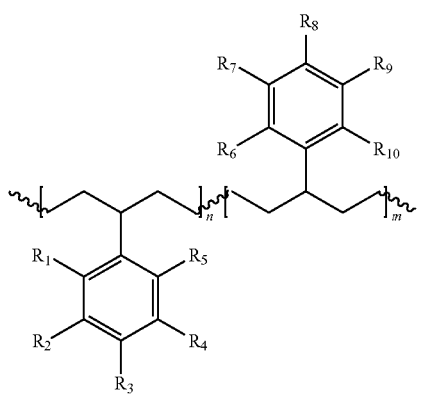

Formula (B)

wherein $R_1$-$R_{10}$ are independently selected from hydrogen, sulfonate, sulfonic acid, or a monovalent $C_1$-$C_{10}$ hydrocarbyl, at least one of $R_1$-$R_5$ is sulfonate or sulfonic acid, and n and m independently are 1 to 10,000.

Also provided are methods of making a polymer. In embodiments, the methods include contacting a compound of formula (I) with a catalyst to form an unsaturated polymer by ring opening metathesis polymerization (ROMP)—

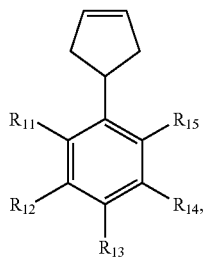

(I)

wherein $R_{11}$-$R_{15}$ are independently selected from hydrogen or a $C_1$-$C_{10}$ hydrocarbyl; contacting the unsaturated polymer with a hydrogenation agent to form a saturated polymer; contacting the saturated polymer with a sulfonating agent to form a saturated polymer substituted with sulfonic acid; and optionally deprotonating the saturated polymer substituted with sulfonic acid to form a saturated sulfonated polymer.

DETAILED DESCRIPTION

Figure 1:
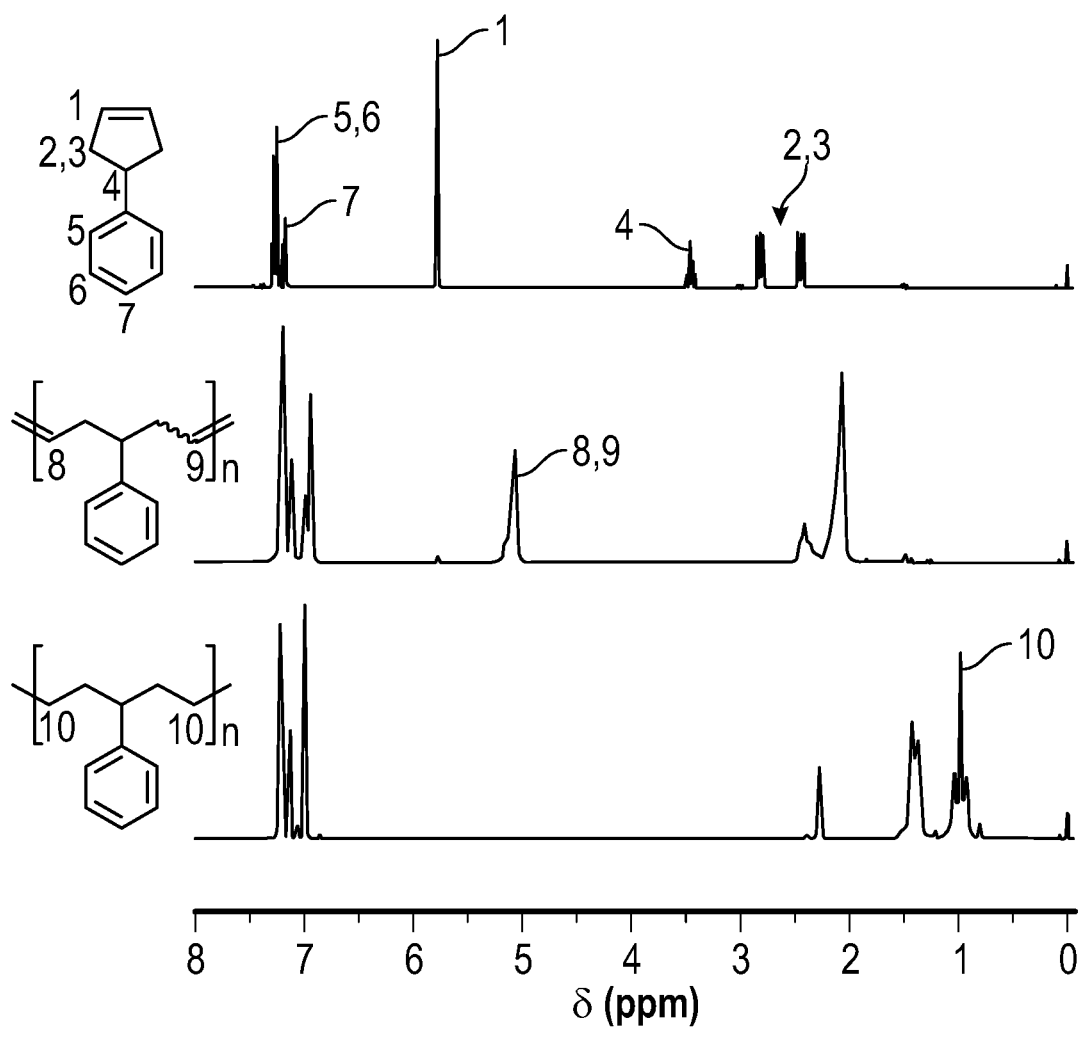
FIG. 1 depicts a stacked comparison of $^1$H-NMR spectra of embodiments of a monomer, a polymer, and a hydrogenated polymer.

Other objects, features, and advantages of the invention will be apparent from the following detailed description, drawings, and claims. Unless otherwise defined, all technical and scientific terms and abbreviations used herein have the same meaning as commonly understood by one of ordinary skill in the art to which this invention pertains. Although methods and compositions similar or equivalent to those described herein can be used in the practice of the present invention, suitable methods and compositions are described without intending that any such methods and compositions limit the invention herein.

Polymers

In embodiments, the polymers herein include a repeat unit having the following structure:

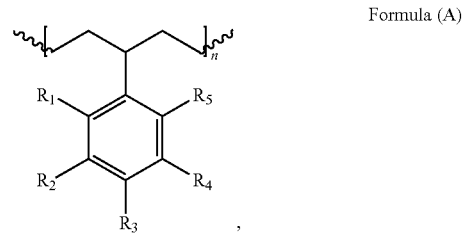

Formula (A)

wherein $R_1$-$R_5$ are independently selected from hydrogen, sulfonate, sulfonic acid, or a monovalent $C_1$-$C_{10}$ hydrocarbyl, at least one of $R_1$-$R_5$ is sulfonate or sulfonic acid, and n is 1 to 10,000. In one embodiment, $R_1$, $R_2$, $R_4$, and $R_5$ are hydrogen, and $R_3$ is sulfonate or sulfonic acid. In another embodiment, $R_2$, $R_3$, $R_4$, and $R_5$ are hydrogen, and $R_1$ is sulfonate or sulfonic acid. In a further embodiments, $R_1$, $R_3$, $R_4$, and $R_5$ are hydrogen, and $R_2$ is sulfonate or sulfonic acid. In an additional embodiment, $R_1$, $R_2$, $R_3$, and $R_5$ are hydrogen, and $R_4$ is sulfonate or sulfonic acid. In a still further embodiment, $R_1$, $R_2$, $R_3$, and $R_4$ are hydrogen, and $R_5$ is sulfonate or sulfonic acid.

In some embodiments, "n" of Formula (A) is about 200 to about 1,200, about 300 to about 1,075, about 500 to about 1,075, about 500 to about 1,000, about 500 to about 800, or about 600 to about 700.

In embodiments, the polymers herein comprise the repeat units of Formula (B):

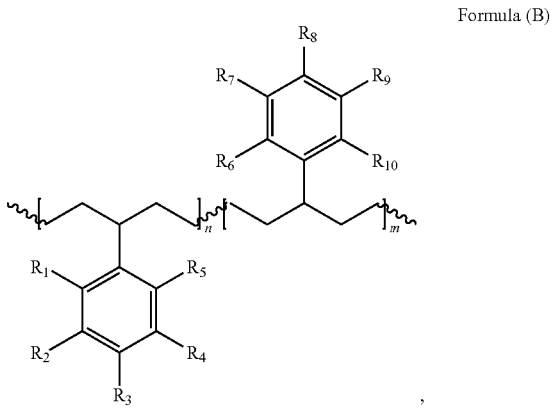

Formula (B)

wherein $R_1$-$R_{10}$ are independently selected from hydrogen, sulfonate, sulfonic acid, or a monovalent $C_1$-$C_{10}$ hydrocarbyl, at least one of $R_1$-$R_5$ is sulfonate or sulfonic acid, and n and m independently are 1 to 10,000.

In some embodiments, at least one of $R_1$-$R_5$ may differ from at least one of $R_6$-$R_{10}$ in the polymers of Formula (B). Therefore, the term "polymer" as used herein, refers to and includes both polymers and copolymers.

The degree of sulfonation of the polymers provided herein may be about 1% to about 150%, about 1% to about 125%, about 1 to about 100%, about 75% to about 125%, or about 80% to about 120%. In some embodiments, at least one of $R_6$-$R_{10}$ is sulfonate or sulfonic acid, and the degree of sulfonation is at least 100%, about 100% to about 150%, about 100% to about 125%, or about 100% to about 110%.

In some embodiments, the sum of "m" and "n" of Formula (B) is about 200 to about 1,200, about 300 to about 1,075, about 500 to about 1,075, about 500 to about 1,000, about 500 to about 800, or about 600 to about 700.

The "degree of sulfonation", which is provided as a percentage herein, generally indicates the average number of sulfonate or sulfonic acid substituents per phenyl pendant group of the polymers provided herein. For example, a degree of sulfonation of 100% indicates an average of one sulfonate or sulfonic acid substituent per phenyl pendant group. Degrees of sulfonation less than 100% indicate an average of less than one sulfonate or sulfonic acid substituent per phenyl pendant group, and degrees of sulfonation greater than 100% indicate an average of more than one sulfonate or sulfonic acid substituent per phenyl pendant group, thereby indicating that a least a portion of the phenyl pendant groups should be substituted with more than one sulfonate or sulfonic acid substituent. For example, a degree of sulfonation of 80% indicates that an average of 80 out of every 100 phenyl pendant groups are substituted with one sulfonate or sulfonic acid substituent.

Generally, the polymers of Formula (B) herein may include any ratio of "m:n" to "n" in order to achieve a desired degree of sulfonation. For example, $R_3$ may be a sulfonate; $R_1$, $R_2$, and $R_4$-$R_{10}$ may be hydrogen; and the ratio of n:m may be 80:20, thereby imparting the polymer with a degree of sulfonation of 80%.

The polymers may include any end groups known in the art, including, but not limited to end groups derived from ethyl vinyl ether, or by end groups derived from telechelic chain transfer agents.

The polymers herein may be cross-linked. The cross-linking may be achieved via olefins in a polymer's "backbone", such as those that are present in the intermediate polypentenamer described herein (see, e.g., Scheme 1). Therefore, as used herein, the symbol "⌇" may represent one bond in polymers that are not cross-linked, or two bonds in polymers that are cross-linked. For example, when the polymers are not cross-linked, the symbol "⌇" may represent one bond between the carbon atom of the monomer and [1] an adjacent monomer of the polymer chain, or [2] an end group; and when the polymers are cross-linked, the symbol "⌇" may represent two bonds, such as a first bond between the carbon atom of the monomer and [1] an adjacent monomer of the polymer chain or [2] an end group, and a second bond between the carbon atom of the monomer and [1] a non-adjacent monomer of the polymer chain or [2] a monomer of a different polymer chain. The terms "monomer" and "repeat unit" are used interchangeably herein.

The glass transition temperature ($T_g$) of the polymers provided herein may be about 5° C. to about 145° C., about 5° C. to about 125° C., about 5° C. to about 100° C., about 5° C. to about 75° C., about 5° C. to about 50° C., about 5° C. to about 40° C., about 10° C. to about 30° C., about 15° C. to about 20° C., or about 17° C.

The polymers provided herein may be employed in block copolymers. For example, the products provided herein may be employed in block copolymers through utilization of chain transfer agents which may install functionalities for sequential growth of alternative polymer segments.

Methods of Making Polymers

Methods of making polymers, such as those of Formula (A) and Formula (B), respectively, are provided herein.

In embodiments, the methods provided herein include contacting a compound of formula (I) with a catalyst to facilitate ring-opening metathesis polymerization (ROMP) to form an unsaturated polymer—

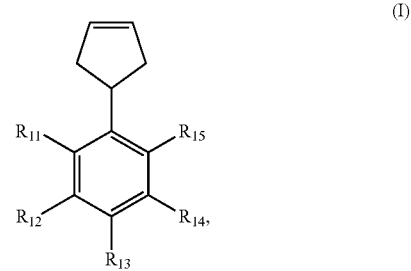

(I)

wherein $R_{11}$-$R_{15}$ are independently selected from hydrogen or a $C_1$-$C_{10}$ hydrocarbyl. In some embodiments, $R_{11}$-$R_{15}$ are hydrogen. The compounds of Formula (I) may be copolymerized with other cyclopentene-based derivatives, including one or more analogues of Formula (I) having different substituents at the positions of $R_{11}$-$R_{15}$.

In some embodiments, the catalyst to facilitate ROMP includes ruthenium, molybdenum, tunsgsten, or a combination thereof. For example, the catalyst may be a Schrock-type catalyst that includes molybdenum and/or tungsten.

In some embodiments, the contacting of a compound of formula (I) with a catalyst to facilitate ROMP occurs in the presence of toluene, tetrahydrofuran (THF), dichloromethane (DCM), or a combination thereof.

In some embodiments, the contacting of a compound of formula (I) with a catalyst to facilitate ROMP occurs at a temperature of about −20° C. to about 50° C.

In some embodiments, the unsaturated polymer produced by the ROMP has the following structure:

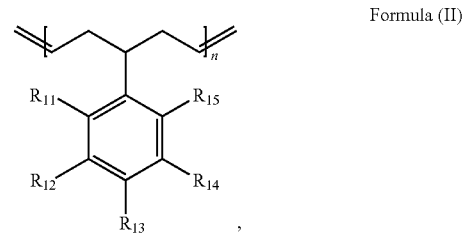

Formula (II)

wherein n is 1 to 10,000. In some embodiments, "n" of Formula (II) is about 200 to about 1,200, about 300 to about 1,075, about 500 to about 1,075, about 500 to about 1,000, about 500 to about 800, or about 600 to about 700. The unsaturated bonds of an unsaturated polymer may have a cis or trans configuration. Any ratio (e.g., from 0:100 to 100:0)

of cis to trans double bonds may be present in an unsaturated polymer. In some embodiments, an unsaturated polymer has a ratio of cis to trans double bonds of 10-30:70-90.

In some embodiments, the methods provided herein include cross-linking the unsaturated polymer. The unsaturated polymer may be partially cross-linked. For example, a "partially cross-linked" unsaturated polymer may be one in which the number of unsaturated bonds is reduced by about 1% to about 50%, about 1% to about 25%, or about 1% to about 10% as a result of the cross-linking, which may be determined by any known techniques, such as the comparison of $^1$H-NMR data collected before and after cross-linking (see, e.g., FIG. 1). The cross-linking may be achieved by any known techniques via the olefins of an unsaturated polymer's backbone, such as those appearing in the intermediate polypentenamer of Formula (II). Therefore, when the methods provided herein include cross-linking an unsaturated polymer, and the cross-linking occurs via the olefins of an unsaturated polymer's backbone, then the cross-linking step may occur prior to contacting the unsaturated polymer with a hydrogenation agent. Not wishing to be bound by any particular theory, it is believed that at least partially cross-linking the unsaturated polymer may increase the elasticity of the polymer, thereby possibly creating a "rubber-like" material.

The methods provided herein may include contacting an unsaturated polymer with a hydrogenation agent to form a saturated polymer. Generally, the hydrogenation agent may be any hydrogenation agent capable of saturating olefins, including hydrogenation agents capable of saturating olefins, but not aromatic moieties, such as a phenyl group. In some embodiments, the hydrogenation agent includes p-tosylhydrazide. The hydrogenation agent may partially or completely hydrogenate the unsaturated bonds. In some embodiments, the hydrogenation agent hydrogenates at least 99% of the unsaturated bonds.

In embodiments, prior to the contacting of a saturated polymer with a sulfonating agent, the molar mass of a saturated polymer, which may or may not be cross-linked, is about 1 kg/mol to about 300 kg/mol, about 1 kg/mol to about 200 kg/mol, about 10 kg/mol to about 125 kg/mol, about 50 kg/mol to about 100 kg/mol, about 75 kg/mol to about 80 kg/mol. In embodiments, prior to the contacting of a saturated polymer with a sulfonating agent, the molar mass of a saturated polymer, which may or may not be cross-linked, is about 45,000 kg/mol to about 160,000 kg/mol. As used herein, the phrase "molar mass" refers to the number average molecular weight, unless noted otherwise.

The methods provided herein may include contacting a saturated polymer with a sulfonating agent to substitute a saturated polymer with a sulfonic acid. The sulfonic acid may be substituted on a phenyl pendant group, for example, at one or more of positions $R_{11}$-$R_{15}$ of Formulas (I) and (II). Any known sulfonating agent may be used. In embodiments, the sulfonating agent includes $H_2SO_4$. The sulfonating agent also may include one or more additives, such as $FeSO_4$, that may aid in sulfonation.

The methods provided herein may include deprotonating a sulfonic acid substituent to form a saturated sulfonated polymer. The deprotonating of a sulfonic acid substituent may include contacting a sulfonic acid substituent with a cationic metal salt. For example, the deprotonating may be achieved with a countercation selected from $Li^+$, $Na^+$, $K^+$, $Mg^{2+}$, or a combination thereof. In some embodiments, deprotonating the sulfonic acid to form a saturated sulfonated polymer includes contacting the saturated polymer substituted with sulfonic acid with a metal hydroxide base, including, but not limited to, NaOH, KOH, LiOH, or a combination thereof. It is believed that the deprotonation of the sulfonic acid groups can ionize the polymer with various metal cations.

In embodiments, the substituted saturated polymer or the saturated sulfonated polymer, each of which may or may not be cross-linked, has a degree of sulfonation of about 1% to about 125%, about 75% to about 125%, or about 80% to about 120%; and a glass transition temperature of about 5° C. to about 40° C., about 10° C. to about 30° C., about 15° C. to about 20° C., or about 17° C.

The phrases "$C_1$-$C_{10}$ hydrocarbyl" and the like, as used herein, generally refer to aliphatic, aryl, or arylalkyl groups containing 1 to 10 carbon atoms. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having 1 to 10 carbon atoms, 2 to 8 carbon atoms, 4 to 6 carbon atoms, etc. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, tolyl, xylyl, mesityl, benzyl, and the like, including any heteroatom substituted derivative thereof.

Unless otherwise indicated, the term "substituted," when used to describe a chemical structure or moiety, refers to a derivative of that structure or moiety wherein one or more of its hydrogen atoms is substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, aryloxy, azo, carbamoyl (—NHC(O)O— alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, phosphodiester, sulfide, sulfonamido (e.g., $SO_2NH_2$), sulfone, sulfonyl (including alkylsulfonyl, arylsulfonyl and arylalkylsulfonyl), sulfoxide, thiol (e.g., sulfhydryl, thioether) or urea (—NHCONH-alkyl-).

The terms "a," "an," and "the" are intended to include plural alternatives, e.g., at least one. For instance, the disclosure of "a catalyst," "a monomer," and the like, is meant to encompass one, or mixtures or combinations of more than one catalyst, monomer, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in one embodiment, that "the glass transition temperature ($T_g$) of the polymer is about 15° C. to about 20° C.". This range should be interpreted as encompassing values in a range of about 15° C. to about 20° C., and further encompasses "about" each of 16° C., 17° C., 18° C., and 19° C., including any ranges and sub-ranges between any of these values.

The processes described herein may be carried out or performed in any suitable order as desired in various implementations. Additionally, in certain implementations, at least a portion of the processes may be carried out in parallel. Furthermore, in certain implementations, less than or more than the processes described may be performed.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

The following materials were used in the examples, unless noted otherwise. Allyltrimethylsilane (98%), benzaldehyde (>99.5%), basic alumina, butylated hydroxytoluene (≥99.0%), chloroform-d, ethyl vinyl ether (99.0%), calcium sulfate (99.5%), o-xylene (97%), p-toluenesulfonhydrazide (97%), phosphorous pentoxide (≥98.0%), Grubbs $1^{st}$ generation catalyst (G1) (97.0%), Grubbs $3^{rd}$ generation catalyst (G3) (97.0%), titanium tetrachloride (≥98.0%), toluene-d8, and tributylamine (≥98.5%) were purchased from Sigma-Aldrich and used as received.

Dichloromethane (DCM) was purified by distillation over phosphorous pentoxide and purged with argon. Nitromethane was dried with calcium chloride and then distilled and purged with argon. Dry toluene and tetrahydrofuran (THF) were obtained from an SPS-4 solvent purification system. Grubbs $2^{nd}$ generation catalyst (G2) and Hoveyda-Grubbs $2^{nd}$ generation (HG2) catalyst were provided by Materia Inc.

A dry ice/chloroform bath and hexane/liquid nitrogen bath were used for reaction cooling to −61±2° C. and −94±2° C., respectively.

The following characterization methods were used in the examples, unless noted otherwise. $^1$H and $^{13}$C NMR experiments were performed on a Bruker 600 MHz and 150 MHz, NMR instrument, respectively, unless otherwise noted. VT-$^1$H-NMR experiments were conducted on a Bruker 500 MHz instrument. $^1$H-$^1$H Correlation Spectroscopy (COSY) and Heteronuclear Multiple-Quantum Correlation (HMQC)-NMR were performed on a Bruker 600 MHz and 15 MHz instrument, respectively.

Polymer molar mass and dispersities were determined on an Agilent-Wyatt combination triple detection size exclusion chromatography (SEC) instrument containing 3 successive Agilent PLgel Mixed C columns, an Agilent 1260 infinity series pump, degasser, autosampler, and thermostatted column chamber. The Wyatt triple detection unit hosted a miniDawn TREOS 3-angle light scattering detector, Optilab TrEX refractive index detector, and a Viscostar II differential viscometer.

Molar mass and dispersities were determined by a 10-point universal calibration with narrow dispersity polystyrene standards varying from 580 to 7,500,000 Da. Differential scanning calorimetry (DSC) experiments were performed on a TA Instruments Model Q100. A heating rate of 10° C./minute under argon flow (40 mL/min) was used. Cooling was provided by an RCS cooler (Model No. RCS 90, refrigerated cooling system). Thermogravimetric analysis (TGA) was performed on a TA Instruments Model Q50.

Infrared spectroscopy was performed on a PerkinElmer 100 FT-IR spectrometer with a diamond ATR accessory.

Example 1—Synthesis of 4-phenyl-1,6-heptadiene

A monomer precursor, 4-phenyl-1,6-heptadiene, was synthesized according to the following procedure. To a flame-dried round-bottom flask, a magnetic stir bar, anhydrous $CH_2Cl_2$ (300 mL) that was previously purged with argon, and $MeNO_2$ (18 mL) that was previously purged with argon were added. The solution was kept under an argon blanket throughout.

The solution was cooled to −61° C. with chloroform and dry ice. $TiCl_4$ (13.32 mL, 121.5 mmol) and benzaldehyde (7.9616 g, 75 mmol) in $CH_2Cl_2$ (30 mL) were added sequentially. After 15 minutes of stirring, the mixture was cooled to −94° C. with hexanes and liquid nitrogen and allyltrimethylsilane (47.67 mL, 300 mmol, 4 eq.) in anhydrous $CH_2Cl_2$ (30 mL) was added over 10 minutes.

The mixture was stirred at −91° C. for 3 hours and then warmed to −61° C. for 20 hours. The mixture was quenched with a saturated solution of $NH_4Cl$. The product was extracted and the aqueous layer was washed twice with DCM. The organic layer was then washed with a saturated NaCl solution. The organic layer was collected and dried over $CaSO_4$ prior to concentrating via rotary evaporation. The crude product (yellow oil) was purified by flash chromatography on silica gel (hexane:ether, 25:1) followed by vacuum distillation (32° C., 184 mTorr) to yield a colorless oil. The product's structure was confirmed by $^1$H NMR, $^{13}$C NMR, and mass spectrometry.

Example 2—Synthesis of 4-phenylcyclopentene

A monomer, 4-phenylcyclopentene (4PCP), was synthesized according to the following procedure. The 4-phenyl-1,6-heptadiene (8.0207 g, 46.6 mmol) of Example 1 in anhydrous $CH_2Cl_2$ (465 mL) was stirred in the presence of Grubbs 1 generation catalyst (G1)(191.5 mg, 0.233 mmol, 0.005 eq.)(see Scheme 1). A dynamic blanket of argon was kept over the solution slowly to promote the removal of ethylene. After 25 hours, the product was concentrated and the crude product was purified by flash chromatography on silica gel (hexane:ether, 25:1) and afforded 4PCP as a colorless oil (5.965 g, 41 mmol, 89% yield). The product's structure was confirmed by $^1H$ NMR, $^{13}C$ NMR, and mass spectrometry.

The monomer, 4PCP, was synthesized through titanium tetrachloride-mediated diallylation of benzaldehyde followed by standard conditions for ring-closing metathesis of the acyclic diene using Grubbs $1^{st}$ generation catalyst, G1 (Scheme 1). Following purification, 4PCP was obtained at approximately 57% yield over two steps.

bath at −15° C. A separate HG2 catalyst solution was made at 0.205 g/mL with dry toluene.

To the precooled flasks, 0.96 mL (1.96 mg HG2, 3.13 μmol, 0.23 mol %) and 0.093 mL (1.91 mg HG2, 3.04 μmol, 0.23 mol %) of the catalyst solution were added respectively and allowed to stir for 12 hours. Twelve hours was chosen due to longer equilibration times at colder temperatures compared to those at warmer temperatures as seen by VT-$^1$H-NMR.

The solutions were quenched with 0.1 mL (1.04 mmol) of ethyl vinyl ether and allowed to stir at −15° C. for 30 minutes. THF was then added to help dissolve the polymer, and allowed to stir at −15° C. for an additional 10 minutes. From the crude products, an aliquot was taken and diluted in $CDCl_3$ for $^1$H-NMR to determine percent conversion. The

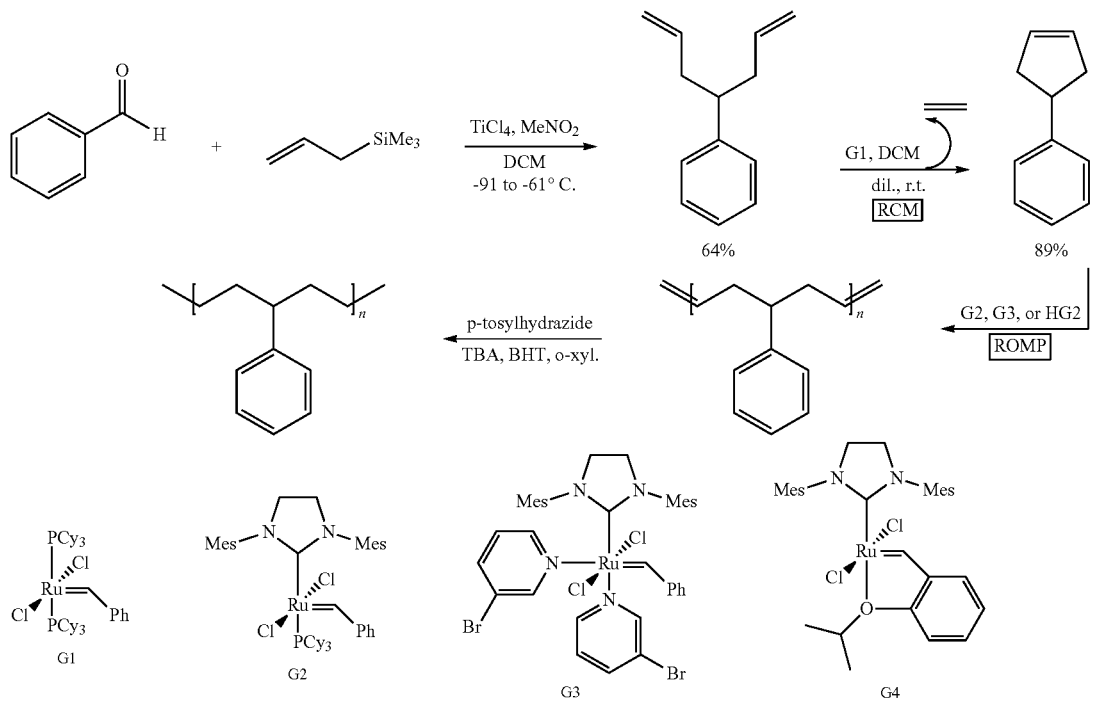

Scheme 1. Total synthesis of H2-P4PCP and various ruthenium-based catalysts used.

Example 3—Synthesis of poly(4-phenylcyclopentene)

The following is a representative example of the polymerizations provided at Table 1 (P4PCP-6 in Table 1). 0.1961 g (1.36 mmol) and 0.1916 g (1.33 mmol) of 4PCP were each added to separate dry round bottom flasks. The flasks were then lightly purged with argon and placed in a precooled remaining crude product was passed through a basic alumina column and directly precipitated into an excess of methanol.

The polymers were then isolated and dried overnight in a vacuum over at 50° C. to obtain the duplicate P4PCP-6 samples ($M_n$=95.6 kg mol$^{-1}$, Đ=1.60, 84.5% conversion and $M_n$=89.0 kg mol$^{-1}$, Đ=1.67, 85.0% conversion). The structures of the polymers were confirmed by $^1$H NMR, $^{13}$C NMR, and mass spectrometry.

TABLE 1

4PCP polymerization results under varying conditions.$^a$

| Sample ID | Solvent | T (° C.) | Catalyst | Conv. (%)$^b$ | $M_{n,theo}$ (kg mol$^{-1}$)$^c$ | $M_{n,SEC}$ (kg mol$^{-1}$)$^d$ | Đ$^d$ |
|---|---|---|---|---|---|---|---|
| P4PCP-1 | toluene | 10 | HG2 | 62.3 ± 0.3 | 39.1 | 47.9 ± 2.7 | 1.51 ± 0.02 |
| P4PCP-2 | toluene | 5 | HG2 | 67.2 ± 0.3 | 42.1 | 47.6 ± 0.5 | 1.65 ± 0.03 |
| P4PCP-3 | toluene | 0 | HG2 | 72.2 ± 0.4 | 45.3 | 50.9 ± 0.6 | 1.63 ± 0.01 |
| P4PCP-4 | toluene | −5 | HG2 | 75.0 ± 0.1 | 47.1 | 67.4 ± 1.4 | 1.60 ± 0.01 |

TABLE 1-continued

4PCP polymerization results under varying conditions.[a]

| Sample ID | Solvent | T (° C.) | Catalyst | Conv. (%)[b] | $M_{n,theo}$ (kg mol$^{-1}$)[c] | $M_{n,SEC}$ (kg mol$^{-1}$)[d] | Đ[d] |
|---|---|---|---|---|---|---|---|
| P4PCP-5 | toluene | −10 | HG2 | 78.9 ± 1.2 | 49.5 | 72.1 ± 0.5 | 1.60 ± 0.15 |
| P4PCP-6 | toluene | −15 | HG2 | 84.6 ± 0.4 | 53.1 | 92.3 ± 3.3 | 1.63 ± 0.03 |
| P4PCP-7 | toluene | 0 | G2 | 64.3 ± 1.2 | 40.3 | 108.0 ± 0.9 | 1.53 ± 0.01 |
| P4PCP-8 | toluene | 0 | G3 | 66.2 ± 1.1 | 41.5 | 67.1 ± 4.8 | 1.55 ± 0.04 |
| P4PCP-9 | (neat)[e] | −15 | HG2 | 81.2 ± 1.1 | 51.0 | 150.9 ± 4.2 | 1.77 ± 0.01 |
| P4PCP-10 | (neat)[e] | −20 | HG2[f] | 81.8 | 45.4 | 110.3 | 1.63 |
| P4PCP-11 | THF | 0 | HG2 | 74 | 46.5 | 76.5 | 1.47 |
| P4PCP-12 | DCM | 0 | HG2 | 71 | 44.5 | 61.7 | 1.60 |

[a]Unless otherwise noted; [4PCP]$_0$ = 4.5M, [cat] = 0.23 mol %, rxn time = 12 h. ± values are based on the standard deviation of duplicate runs
[b]determined by $^1$H-NMR analysis (CDCl$_3$) following termination with ethyl vinyl ether.
[c]based on monomer-catalyst ratio adjusted for % conversion (supporting information).
[d]determined by SEC (RI) analysis in THF compared to a 10 pt. conventional calibration using narrow dispersity polystyrene standards.
[e]neat = 6.67M.
[f]0.26 mol %.

The results of the foregoing catalyst comparison tests (P4PCP-3, 7 and 8) indicated, for these particular tests, that the Hoveyda-Grubbs 2$^{nd}$ generation catalyst (HG2, Scheme 1) consistently outperformed Grubbs 3$^{rd}$ generation (G3) and 2$^{nd}$ generation catalyst (G2) with regards to % conversion at 0° C. after 12 hrs. Therefore, HG2 was chosen for the remaining studies. As shown at Table 2, a series of temperature investigations (P4PCP-(1-6)) were performed at temperatures from 10° C. to −15° C. in toluene ([4PCP]$_0$=4.5 M, 0.23% HG2). Monomer conversion increased linearly as temperature was decreased with 84.6% conversion achieved at −15° C.

TABLE 2

Results of polymerizations performed in duplicate from Table 1 at varying temperatures, catalysts, and solvents.

| ID[a] | Temp (° C.) | Cat. | Solvent | % Conversion[b] | $M_n$, theo[c] kg/mol | $M_n$,[d] kg/mol | Đ[d] |
|---|---|---|---|---|---|---|---|
| 1a | 10 | HG2 | Toluene | 62.6 | 39.3 | 45.2 | 1.52 |
| 1b | 10 | HG2 | Toluene | 62 | 38.9 | 50.6 | 1.49 |
| avg. | | | | 62.3 | 39.1 | 47.9 | 1.51 |
| std dev. | | | | 0.42 | 0.28 | 3.82 | 0.02 |
| ±error | | | | 0.30 | 0.20 | 2.70 | 0.02 |
| 2a | 5 | HG2 | Toluene | 66.9 | 41.9 | 47.6 | 1.63 |
| 2b | 5 | HG2 | Toluene | 67.5 | 42.3 | 48.6 | 1.68 |
| avg. | | | | 67.2 | 42.1 | 47.6 | 1.65 |
| std dev. | | | | 0.42 | 0.28 | 0.71 | 0.04 |
| ±error | | | | 0.30 | 0.20 | 0.50 | 0.03 |
| 3a | 0 | HG2 | Toluene | 72.5 | 45.5 | 51.5 | 1.63 |
| 3b | 0 | HG2 | Toluene | 71.8 | 45 | 50.3 | 1.62 |
| avg. | | | | 72.2 | 45.3 | 50.9 | 1.63 |
| std dev. | | | | 0.49 | 0.35 | 0.85 | 0.01 |
| ±error | | | | 0.35 | 0.25 | 0.60 | 0.00 |
| 4a | −5 | HG2 | Toluene | 75 | 47 | 66 | 1.59 |
| 4b | −5 | HG2 | Toluene | 75.1 | 47.1 | 68.8 | 1.59 |
| avg. | | | | 75 | 47.1 | 67.4 | 1.6 |
| std dev. | | | | 0.07 | 0.07 | 1.98 | 0.00 |
| ±error | | | | 0.05 | 0.05 | 1.40 | 0.00 |
| 5a | −10 | HG2 | Toluene | 80.1 | 50.2 | 72.5 | 1.74 |
| 5b | −10 | HG2 | Toluene | 77.8 | 48.8 | 71.6 | 1.45 |
| avg. | | | | 78.9 | 49.5 | 72.1 | 1.6 |
| std dev. | | | | 1.63 | 0.99 | 0.64 | 0.21 |
| ±error | | | | 1.15 | 0.70 | 0.45 | 0.15 |
| 6a | −15 | HG2 | Toluene | 85 | 53.3 | 89 | 1.67 |
| 6b | −15 | HG2 | Toluene | 84.3 | 52.9 | 95.6 | 1.6 |
| avg. | | | | 84.6 | 53.1 | 92.3 | 1.63 |
| std dev. | | | | 0.49 | 0.28 | 4.67 | 0.05 |
| ±error | | | | 0.35 | 0.20 | 3.30 | 0.03 |
| 7a | 0 | G2 | Toluene | 65.4 | 41 | 107.1 | 1.52 |
| 7b | 0 | G2 | Toluene | 63.1 | 39.6 | 108.9 | 1.54 |
| avg. | | | | 64.3 | 40.3 | 108 | 1.53 |
| std dev. | | | | 1.63 | 0.99 | 1.27 | 0.01 |
| ±error | | | | 1.15 | 0.70 | 0.90 | 0.01 |
| 8a | 0 | G3 | Toluene | 65.1 | 40.8 | 62.3 | 1.51 |
| 8b | 0 | G3 | Toluene | 67.2 | 42.1 | 71.8 | 1.58 |
| avg. | | | | 66.2 | 41.5 | 67.1 | 1.55 |
| std dev. | | | | 1.48 | 0.92 | 6.72 | 0.05 |
| ±error | | | | 1.05 | 0.65 | 4.75 | 0.04 |
| 9a | −15 | HG2 | Neat[e] | 80.2 | 50.3 | 155 | 1.78 |
| 9b | −15 | HG2 | Neat[e] | 82.3 | 51.6 | 146.7 | 1.77 |
| avg. | | | | 81.2 | 51 | 150.9 | 1.77 |
| std dev. | | | | 1.48 | 0.92 | 5.87 | 0.01 |
| ±error | | | | 1.05 | 0.65 | 4.15 | 0.01 |

[a]Unless otherwise noted, polymerizations were run for 12 hours at a constant catalyst loading of 0.23 mol % at 4.5M. "± error" is the standard error of the mean.
[b]Determined via $^1$HNMR of the crude product.
[c]Theoretically calculated (see Example 6).
[d]Experimentally measured using SEC-MALS via conventional column calibration.
[e]Neat = 6.67M.

Equilibrium monomer concentrations were consistent with extrapolated values from the VT-NMR thermodynamic study. For polymerizations performed at ≥0° C. (P4PCP-(1-3)), SEC determined $M_n$ values were close to theoretical $M_n$ values. At temperatures lower than 0° C. (P4PCP-(4-6)), experimental $M_n$ values were progressively higher than theoretical with the coldest temperatures leading to the largest discrepancy. This was believed to be due to the reduced initiation efficiency of HG2 below 0° C.

However, the resulting $M_n$ values of each duplicate polymerization were very similar regardless of temperature, which was believed to suggest that molar mass can be reproduced consistently and with some degree of predictability under controlled conditions. Comparison of polymerizations in toluene, THF, and DCM at 0° C. (P4PCP-3, 11, 12) demonstrated that, at least in this example, solvent had little effect on conversion percentage although THF resulted in higher $M_n$ and less Đ. Neat polymerizations (P4PCP-9, 10) were performed at −15 and −20° C. but did not improve % conversion, as anticipated. However, these did result in the highest $M_n$ values of 110 and 151 kg mol$^{-1}$, respectively.

Example 4—Hydrogenation

P4PCP-10 (6.1221 g, 42 mmol olefin) was dissolved in 370 mL of o-xylene. A catalytic amount (~2 mg) of BHT inhibitor was added followed by tributylamine (38.923 g, 210 mmol) and p-tosylhydrazide (34.9179 g, 187 mmol). The mixture was refluxed for 8 hours.

The solution was then cooled to room temperature and polymer product was precipitated in methanol. The hydrogenated polymer (H2-P4PCP) was isolated by filtration and then reprecipitated. The polymer was then freeze dried from benzene overnight under vacuum (94.4% yield). The structures of the polymers were confirmed by $^1$H NMR, $^{13}$C NMR, and mass spectrometry.

Quantitative homogeneous hydrogenation of P4PCP resulted in a precision ethylene-styrene (ES) copolymer (H$_2$-P4PCP) with a phenyl branch at every fifth carbon along the backbone. This equated to a perfectly alternating trimethylene-styrene sequence with 71.2% w/w styrene content that is believed to be inaccessible through molecular catalyst copolymerization strategies.

Differential scanning calorimetry confirmed P4PCP and H$_2$-P4PCP were amorphous materials with similar glass transition temperatures (T$_g$) of 17±2° C. Both materials presented well-defined styrenic analogs for application in specialty materials or composites where lower softening temperatures may be desired.

P4PCP-10 (M$_n$=110 kg mol$^{-1}$, Đ=1.63) was chosen as a representative sample for further analysis. The backbone olefin microstructure was determined to be 84% trans and 16% cis through inverse gated decoupling $^{13}$C-NMR in CDCl$_3$. Homogeneous hydrogenation of P4PCP-10 was performed with p-tosylhydrazide and tributylamine in refluxing o-xylene for 8 h resulting in quantitative saturation of the backbone.

FIG. 1 displays a stacked comparison of $^1$H-NMR spectra (CDCl$_3$) for 4PCP (top), P4PCP-10 (middle), and the hydrogenated derivative, H$_2$-P4PCP (bottom). Successful synthesis of each step was evidenced by the shifting and broadening of olefin protons signals from 4PCP (peak 1) to P4PCP (peaks 8,9) and their complete disappearance following hydrogenation. Further confirmation of hydrogenation was demonstrated by the appearance of the methylene unit protons (peak 10) in H$_2$-4PCP. Quantitative hydrogenation is concluded by the complete disappearance of the olefin proton peaks (8,9) and the appearance of a new methylene proton peak (10) in the H$_2$-P4PCP spectrum.

Figure 2:
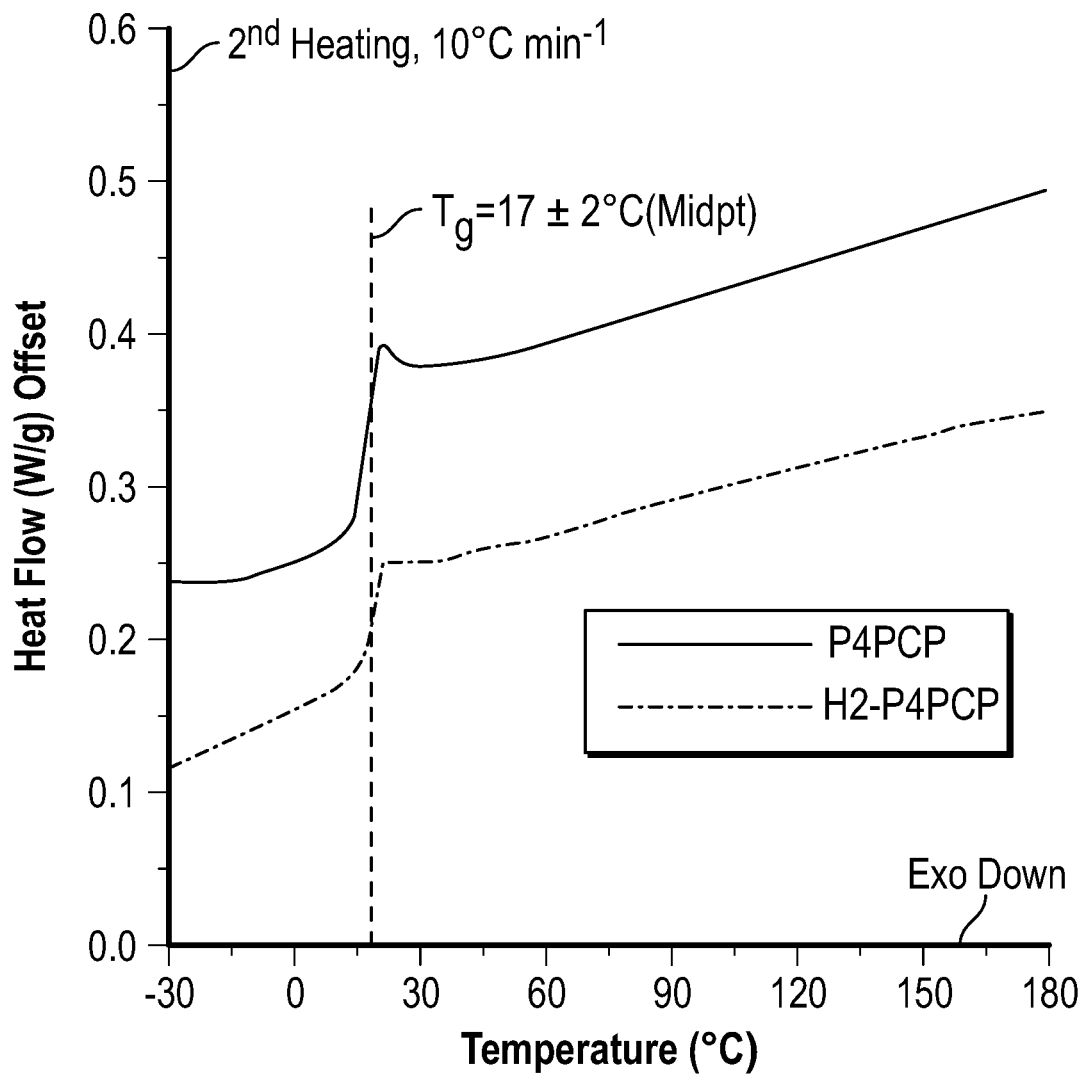
FIG. 2 depicts a differential scanning calorimetry (DSC) thermogram overlay of embodiments of a polymer and a hydrogenated polymer.

Thermogravimetric analysis of P4PCP-10 and H$_2$-P4PCP was performed under argon and both exhibited good thermal stability with less than 5% weight loss up to 346±2° C. and 401±2° C., respectively. The results from differential scanning calorimetry (DSC) upon a second heating from −30 to 180° C. at 10° C. min$^{-1}$ is shown at FIG. 2 for P4PCP-10 and H$_2$-P4PCP. Specifically, FIG. 2 depicts a DSC thermogram overlay of P4PCP-10 and H$_2$-P4PCP (offset). Data was acquired upon a second heating from −30° C. to 180° C. at 10° C. min$^{-1}$. T$_g$ is reported as the midpoint of the endotherm. Both systems were amorphous with identical glass transition temperatures (T$_g$=17±2° C.). The T$_g$ of H$_2$-P4PCP was slightly less than a previously reported for a "pseudo-random" ES interpolymer of 69% w/w styrene (T$_g$=22.7° C.) made by The Dow Chemical Company's INSITE™ catalysts. The slightly higher T$_g$ was believed to be due to the homogeneous contamination of styrene homopolymer which was reportedly present at ~10% w/w in the ES interpolymer.

In view of the foregoing results, the ROMP of 4-phenylcyclopentene to produce a precision polypentenamer (P4PCP) with a phenyl branch at every 5th carbon was successful. High conversions (~80%) and high molar mass (~100 kg mol-1) were consistently achieved at cold polymerization temperatures (−15° C.) using HG2 catalyst.

Hydrogenation of P4PCP was performed quantitatively under mild homogeneous conditions to afford H2-P4PCP; a precision ES copolymer with exactly 71.2% w/w (40 mol %) styrene and much lower dispersity than ES copolymers produced through molecular catalyst methods. Both systems had excellent thermal stability and the near ambient Tg (~17° C.) of these materials was believed to provide an opportunistic styrenic analog.

The methods herein, including those of the foregoing examples, are provided for making a polystyrene-polyethylene-type copolymer analog (which is called hydrogenated poly(4-phenylcyclopentene) or H$_2$-P4PCP) that has a phenyl branch placed precisely at every 5$^{th}$ carbon along the polyethylene like backbone (see Scheme 1). For comparison, polystyrene (PS) is believed to have a phenyl branch at precisely every 2$^{nd}$ carbon. The reduction in phenyl branch periodicity for the system and products provided herein was revealed to dramatically reduce the glass transition temperature (T$_g$) from 110° C. (PS) to −17° C. (H$_2$-P4PCP) and embodiments of the products herein remained amorphous. In addition to other uses provided herein, this T$_g$ may permit the materials to be used as dampening material to reduce vibration and noise.

Therefore, it was believed that embodiments of the products herein are prone to improved softening and flexibility at ambient temperatures, and that structural integrity and elasticity may be improved upon, in some instances, by at least partially cross-linking the olefin backbone prior to hydrogenation.

Example 5—Sulfonation

Due to the precise and diluted spacing of the phenyl branches of the polymers of the foregoing examples, it was believed that the full sulfonation (i.e. one sulfonate functionality per phenyl branch) of the polymer of these examples could create new materials to rival PSS, due at least in part to the enhanced flexibility of the native polymer.

Preliminary attempts to sulfonate H$_2$-P4PCP of molar mass ranging from 11-78 kg mol$^{-1}$ were successful with 80-120% sulfonation achieved as confirmed by elemental analysis, titration, and $^1$H NMR spectroscopy (see Scheme 2).

Scheme 2. Synthesis of sulfonated H$_2$-P4PCP from the monomer 4-phenylcyclopentene (4PCP).

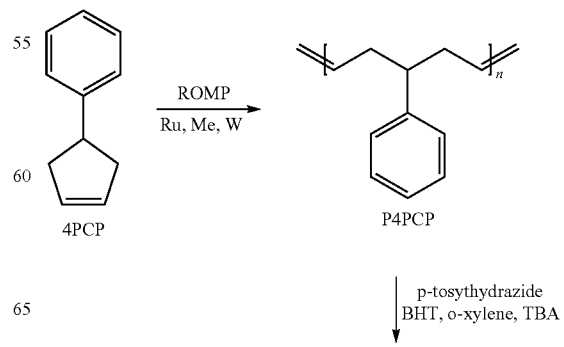

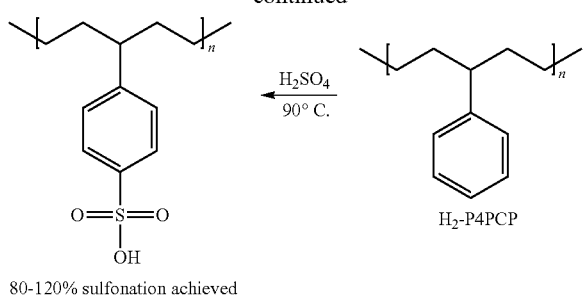

80-120% sulfonation achieved

Figure 3:
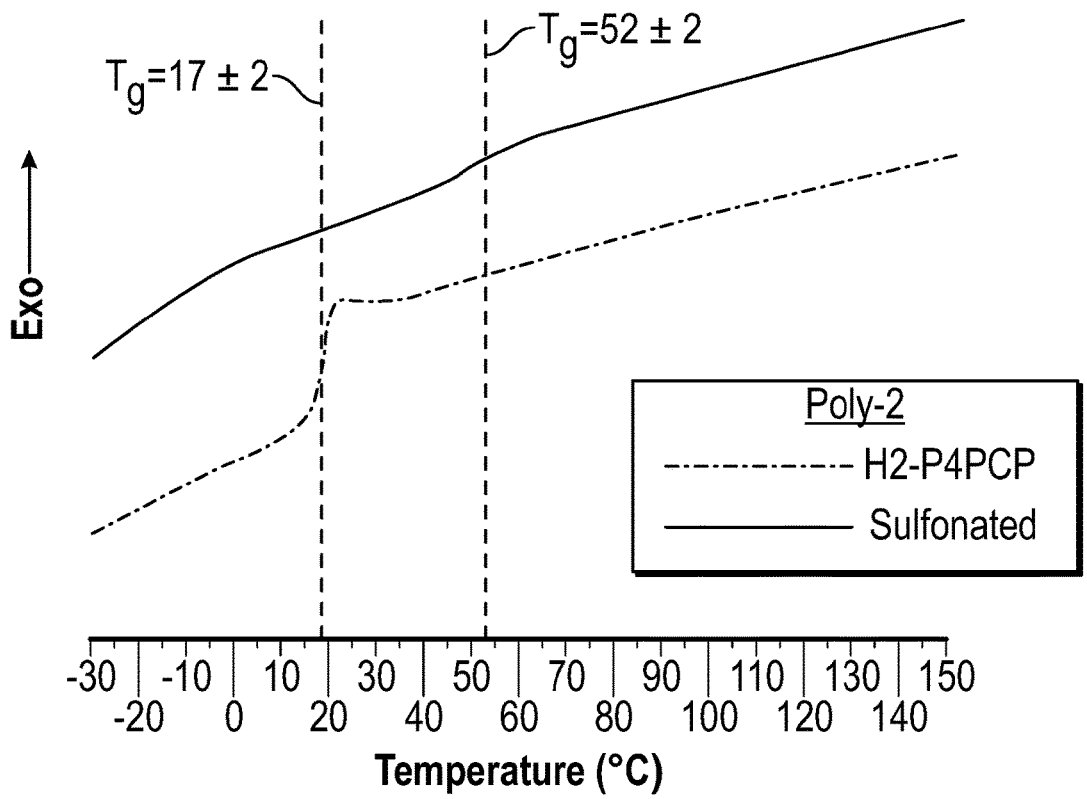
FIG. 3 depicts DSC data for embodiments of a polymer before and after sulfonation.
Figure 4:
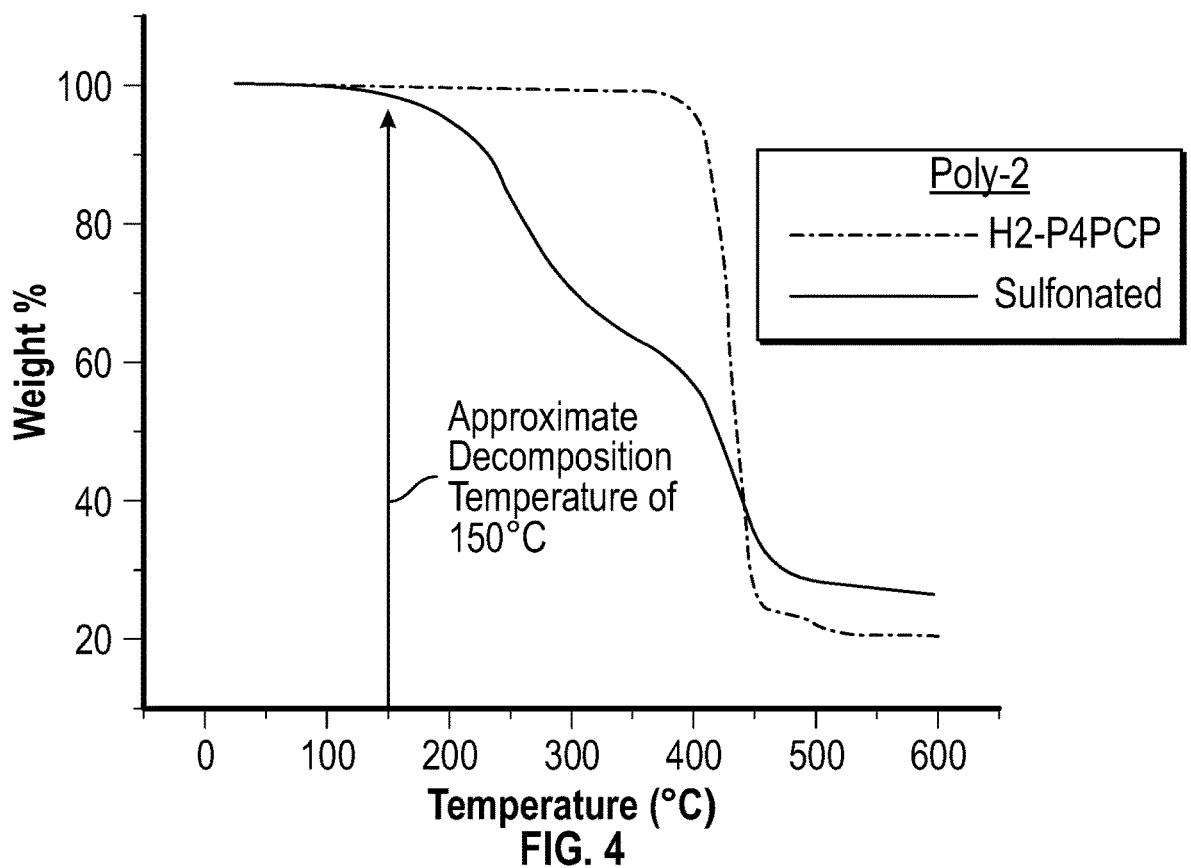
FIG. 4 depicts thermogravimetric analysis (TGA) data collected from an embodiment of a polymer before and after sulfonation.

The higher values of sulfonation obtained by elemental analysis could be attributed to residual sulfuric acid remaining within the polymer prior to analysis. The addition of ionic character to polymeric materials is believed to increase $T_g$. For highly sulfonated PSS, the $T_g$ raises to temperatures above the thermal decomposition range of the polymer. For the systems herein, having a native material with a much lower $T_g$, sulfonation also increased $T_g$ to −50° C. (FIG. 3), which is well below the decomposition temperature of the material (~150° C., FIG. 4). Specifically, FIG. 3 depicts DSC data of Poly-2 (i.e., H$_2$-P4PCP) before and after sulfonation. Both thermograms represented the second heating cycle from −30° C. to 150° C. at a heating and cooling rate of 10° C. min$^{-1}$. An increase of the glass transition temperature ($T_g$) was evident after sulfonation. FIG. 4 depicts thermogravimetric analysis (TGA) data under N$_2$ of Poly-2 (i.e., H$_2$-P4PCP) before and after sulfonation. The sample was held at 100° C. for 5 minutes to liberate water prior to heating to 600° C. at 10° C. min$^{-1}$. Weight loss began to occur at about 150° C. with the sulfonated polymer, which is consistent with PSS, due to desulfonization.

TABLE 3

Successfully sulfonated H$_2$-4PCP of varying molar mass.

| ID | M$_n$ H$_2$-P4PCP [kg mol$^{-1}$][a] | PDI[a] | % sulfonation[b] | % sulfonation[c] | M$_n$ SP4PCP [kg mol$^{-1}$][d] |
|---|---|---|---|---|---|
| Poly-1 | 11.2 | 1.50 | 101.00 | 104.00 | 17.5 |
| Poly-2 | 51.5 | 1.68 | 102.00 | 117.00 | 80.6 |
| Poly-3 | 77.8 | 1.60 | 96.00 | 124.00 | 119.2 |

[a] Determined by SEC (RI) analysis in THF compared to a 10 pt. conventional calibration using narrow dispersity polystyrene standards.
[b] Determined via titration.
[c] Determined by elemental analysis.
[d] Based on percent of sulfonation via titration.

The total removal of water from the sulfonated polymer was difficult even after freeze-drying and annealing under high vacuum in an oven at 150° C. Therefore the $T_g$ reported in FIG. 3 is expected to increase slightly when the material is completely dry.

Nevertheless, the $T_g$ for the systems of the foregoing examples places these materials in a unique category having phenylsulfonic acid functionality and an accessible softening temperature. Applications such as flexible electronics, which often couple PSS with PEDOT to create the electrolyte transport layer, are often complicated by the fact that PSS is a high-$T_g$ and brittle material. The material of this example could serve as an opportunistic alternative to PSS for this and other applications.

Example 6—Calculations $\Delta H$ and $\Delta S$ determinations were made. Based on the Gibbs-Helmholtz equation—

$$\Delta G^0 = \Delta H^0 - T\Delta S^0,$$

ROMP thermodynamics were analyzed as equilibrium polymerizations with the relationship—

$$\ln[M]_e = \frac{\Delta H}{RT} - \frac{\Delta S^0}{R}.$$

wherein $[M]_e$ is the equilibrium monomer concentration at temperature (T) in Kelvin. $\Delta H$ is the enthalpy change during polymerization and $\Delta S^0$ is the standard entropy change calculated from the equation above using $\Delta H = -21.34$ kJ mol$^{-1}$, 273 K, $[M]_e = 1.20$ M. R is the universal gas constant (8.314 J mol$^{-1}$ K$^{-1}$) or 1.99 cal mol$^{-1}$K$^{-1}$).

Theoretical molar mass ($M_{n,theo}$) calculations also were performed. The equation used for determination of $M_{n,theo}$ in Table 1 was—

$$M_{n,theo} = FW_{4PCP}\left(\frac{[M]_0}{[cat]} \times \text{conversion}\right),$$

wherein $FW_{PCP}$ is the formula weight of 4-phenylcyclopentene (144.22 g mol$^{-1}$), $[M]^0$ is the initial monomer concentration, and [cat] is the catalyst concentration.

Ring-opening metathesis polymerization (ROMP) of 4-phenylcyclopentene (4PCP) was investigated under various conditions. Thermodynamic analysis revealed a polymerization enthalpy and entropy sufficient for high molar mass and conversions at lower temperatures. In these examples, neat polymerization using Hoveyda-Grubbs 2$^{nd}$ generation catalyst at −15° C. yielded 81% conversion to poly(4-phenylcyclopentene) (P4PCP) with a number average molar mass of 151 kg mol$^{-1}$ and dispersity of 1.77.

Previous thermodynamic studies on the ROMP of cyclopentene (CP) indicated that monomer/polymer equilibrium may play a much larger role when compared to cyclic alkenes with higher ring strain. Furthermore, the small enthalpic contribution to the Gibbs-Helmholtz equation for ROMP of CP was believed to cause this equilibrium to become much more sensitized to polymerization temperature. The effect that substituents have on the ring strain of CP and its subsequent polymerizability is believed to be less straightforward. For example, hydroxyl functionality at the 4 position of CP is believed to retain sufficient ring strain for polymerization, while an acetoxy functional group on the 3 position is believed to result in no polymer. This phenomenology is believed to be attributed to bond-angle compressions resulting from the gem-dimethyl (Thorpe-Ingold) effect. Recent work by Choi et al. however has showed that substituted cyclopentenes at the 3 position can undergo ROMP through a tandem ring-opening/ring-closing metathesis pathway (Lee, H.-K.; Bang, K.-T.; Hess, A.; Grubbs, R. H.; Choi, T.-L., J. Am. Chem. Soc. 2015, 137, 9262-9265).

Figure 5:
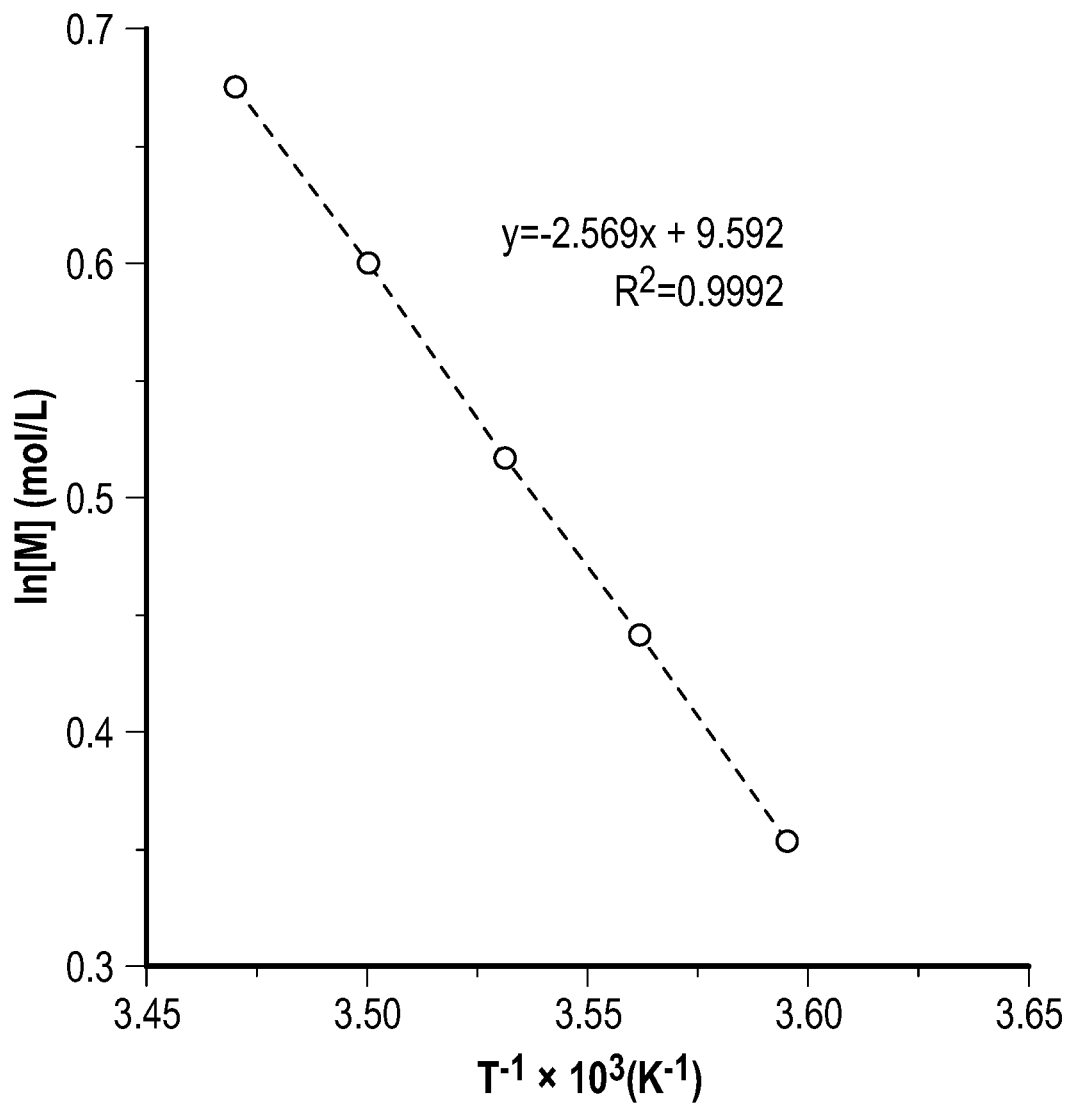
FIG. 5 depicts the equilibrium monomer concentration versus temperature for one embodiment of a method and product herein.

To probe the efficacy of the ROMP of 4PCP, variable temperature (VT) $^1$H-NMR was used to monitor the change in equilibrium monomer concentration [M], as a function of temperature (5° C.<T<15° C.) for a 2.5 M solution (0.23 mol % HG2) in toluene-ds. At each temperature, the conversion of monomer to polymer was monitored until equilibrium was reached. A plot of logarithmic [M], versus inverse temperature (K$^{-1}$), (FIG. 5), provides the enthalpic contribution ($\Delta$H/R) as the slope, where R is the universal gas constant (1.99 cal mol$^{-1}$ K$^{-1}$). Specifically, FIG. 5 depicts the equilibrium monomer concentration versus temperature as determined by VT-$^1$H-NMR in d$_8$-toluene ([4PCP]$_0$= 2.5M, [HG2]=0.23 mol %). Linear regression analysis was performed to determine, $\Delta$H=−5.1 kcal mol$^{-1}$ and $\Delta$S$^\circ$= −19.1 cal mol$^{-1}$ K$^{-1}$ for 4PCP under these conditions (Supporting Information). These values were similar to those observed for ROMP of cyclopentene ($\Delta$H=−5.6 kcal mol$^{-1}$ and $\Delta$S$^\circ$=−18.5 cal mol K$^{-1}$) and 3-cyclopenten-1-ol ($\Delta$H= −6.2 kcal mol$^{-1}$ and $\Delta$S$^\circ$=−18.9 cal mol$^{-1}$K$^{-1}$) recently reported using similar catalysts. reported using similar catalysts.

A sufficiently negative $\Delta$H value of 4PCP was believed to suggest that high molar mass and high conversion were possible through temperature reduction and increasing monomer concentration. Therefore a series of polymerizations were performed with varying catalyst, solvent, and temperature (Table 1) to analyze the conversions and molar masses obtained. All samples were terminated with ethyl vinyl ether at the respective polymerization temperatures to prevent depolymerization upon warming. $^1$H-NMR analysis (CDCl$_3$) of each sample was performed to determine the percent conversion by integration ratios of the monomer and polymer olefinic proton peaks. (See FIG. 2). After catalyst removal and precipitation in methanol, the resulting white solids were analyzed via size exclusion chromatography (SEC) in THF to determine number-average molar mass (M$_n$) and dispersity (Đ) compared to a 10 point conventional calibration using narrow Đ polystyrene standards. For the temperature and catalyst studies, polymerizations were performed in duplicate to ensure consistent results. The values reported in Table 1 for % conversion, M$_n$, and Đ represented the average of both duplicate samples with the (±) standard error of the mean (Supporting information).

The invention claimed is:

1. A polymer comprising repeat units according to Formula (B):

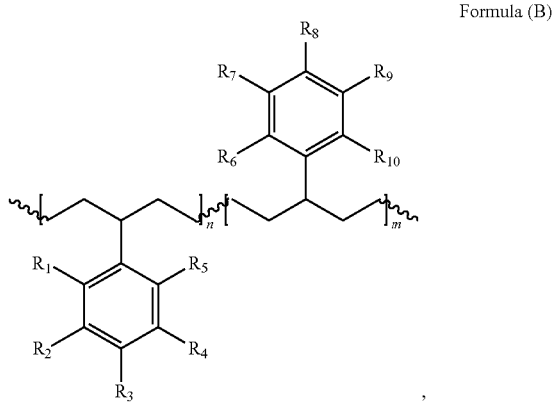

Formula (B)

wherein R$_1$-R$_{10}$ are independently selected from hydrogen, sulfonate, sulfonic acid, or a monovalent C$_1$-C$_{10}$ hydrocarbyl,
at least one of R$_1$-R$_5$ is sulfonate or sulfonic acid,
n and m independently are 1 to 10,000, and
wherein at least one of the repeat units comprising R$_1$-R$_5$ is covalently bonded to at least one of the repeat units comprising R$_6$-R$_{10}$.

2. The polymer of claim 1, wherein the polymer has a degree of sulfonation of about 1% to about 125%.

3. The polymer of claim 1, wherein the polymer has a degree of sulfonation of about 80% to about 120%.

4. The polymer of claim 1, wherein at least one of R$_6$-R$_{10}$ is sulfonate or sulfonic acid, and the polymer has a degree of sulfonation of about 100% to about 120%.

5. The polymer of claim 1, wherein the polymer has a glass transition temperature (T$_g$) of about 5° C. to about 145° C.

6. The polymer of claim 1, wherein the polymer has a glass transition temperature (T$_g$) of about 10° C. to about 30° C.

7. The polymer of claim 1, wherein the polymer is at least partially cross-linked.

8. A polymer consisting of repeat units according to Formula (A):

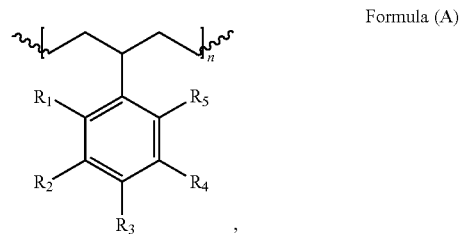

Formula (A)

wherein, independently for each of the repeat units of Formula (A), R$_1$-R$_5$ are independently selected from hydrogen, sulfonate, sulfonic acid, or a monovalent C$_1$-C$_{10}$ hydrocarbyl,
at least one of R$_1$-R$_5$ of at least one of the repeat units of Formula (A) is sulfonate or sulfonic acid, and
n is 200 to 10,000.

9. The polymer of claim 8, wherein the polymer has a glass transition temperature (T$_g$) of about 5° C. to about 145° C.

10. The polymer of claim 8, wherein the polymer has a glass transition temperature (T$_g$) of about 10° C. to about 30° C.

11. The polymer of claim 8, wherein R$_1$, R$_2$, R$_4$, and R$_5$ are hydrogen, and R$_3$ is sulfonate or sulfonic acid.

12. The polymer of claim 8, wherein the polymer is at least partially cross-linked.

13. A method of making a polymer, the method comprising:
contacting a compound of formula (I) with a catalyst to form an unsaturated polymer by ring opening metathesis polymerization—

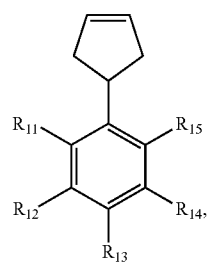

(I)

wherein $R_{11}$-$R_{15}$ are independently selected from hydrogen or a monovalent $C_1$-$C_{10}$ hydrocarbyl;

contacting the unsaturated polymer with a hydrogenation agent to form a saturated polymer;

contacting the saturated polymer with a sulfonating agent to form a saturated polymer substituted with sulfonic acid; and optionally deprotonating the saturated polymer substituted with sulfonic acid to form a saturated sulfonated polymer.

14. The method of claim 13, wherein the saturated polymer substituted with sulfonic acid or the saturated sulfonated polymer has a glass transition temperature ($T_g$) of about 5° C. to about 145° C.

15. The method of claim 13, wherein the saturated polymer substituted with sulfonic acid or the saturated sulfonated polymer has a glass transition temperature ($T_g$) of about 10° C. to about 30° C.

16. The method of claim 13, wherein, prior to the contacting of the saturated polymer with the sulfonating agent, the molar mass of the saturated polymer is about 45 kg/mol to about 160 kg/mol.

17. The method of claim 13, wherein the saturated polymer substituted with sulfonic acid or the saturated sulfonated polymer has a degree of sulfonation of about 1% to about 125%.

18. The method of claim 13, wherein the saturated polymer substituted with sulfonic acid or the saturated sulfonated polymer has a degree of sulfonation of about 80% to about 120%.

19. The method of claim 13, further comprising at least partially cross-linking the unsaturated polymer prior to the contacting of the unsaturated polymer with the hydrogenation agent.

* * * * *